US011449138B1

United States Patent
Giordano et al.

(10) Patent No.: US 11,449,138 B1
(45) Date of Patent: Sep. 20, 2022

(54) SACCADE-BASED POSITIONING FOR RADIAL USER INTERFACE

(71) Applicant: Meta Platforms Technologies, LLC, Menlo Park, CA (US)

(72) Inventors: Marcello Giordano, Toronto (CA); Mark Parent, Toronto (CA); Daniel John Wigdor, Toronto (CA); Stephanie Santosa, Toronto (CA); Tovi Samuel Grossman, Toronto (CA); Sunggeun Ahn, Yuseong-gu (KR)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/329,693

(22) Filed: May 25, 2021

Related U.S. Application Data

(60) Provisional application No. 63/135,573, filed on Jan. 9, 2021.

(51) Int. Cl.
*G06F 3/01* (2006.01)
*G06F 3/0482* (2013.01)
(Continued)

(52) U.S. Cl.
CPC ............ *G06F 3/013* (2013.01); *G06F 3/0482* (2013.01); *H04M 1/2477* (2013.01); *H04N 1/00408* (2013.01); *H04N 1/00416* (2013.01)

(58) Field of Classification Search
CPC .... G06F 3/013; G06F 3/0482; H04M 1/2477; H04N 1/00408; H04N 1/00416
(Continued)

(56) References Cited

U.S. PATENT DOCUMENTS

2009/0327963 A1* 12/2009 Mouilleseaux ..... G06F 3/04883
715/834
2011/0066981 A1* 3/2011 Chmielewski ........ G06F 3/0482
715/834
(Continued)

FOREIGN PATENT DOCUMENTS

EP 3115871 A1 1/2017
EP 3244285 A1 11/2017

OTHER PUBLICATIONS

International Search Report and Written Opinion for International Application No. PCT/US2022/011734, dated May 2, 2022, 08 pages.

*Primary Examiner* — Mihir K Rayan
(74) *Attorney, Agent, or Firm* — Freestone Intellectual Property Law PLLC; Aaron J. Visbeek; Andrew J. Cameron

(57) ABSTRACT

A method of saccade-based positioning of a radial user interface includes performing operations while a first radial user interface is displayed on a display. The operations include (a) detecting a saccade movement based on eye-tracking data received from an eye-tracking system; (b) determining whether the saccade movement crosses a first region border corresponding to a first region of the first radial user interface; (c) determining a velocity of the saccade movement based on the eye-tracking data; and (d) dynamically determining a location for a subsequent radial user interface in response to the velocity and in response to determining that the saccade movement crosses the first region border. The method also includes displaying, on the display, the subsequent radial user interface at the location.

20 Claims, 9 Drawing Sheets

(51) Int. Cl.
_H04N 1/00_ (2006.01)
_H04M 1/247_ (2021.01)

(58) Field of Classification Search
USPC .......................................... 715/810, 834, 841
See application file for complete search history.

(56) References Cited

U.S. PATENT DOCUMENTS

2017/0123492 A1* 5/2017 Marggraff ........... G06F 3/04845
2019/0354173 A1* 11/2019 Young ................ G02B 27/0093

* cited by examiner

SACCADE-BASED POSITIONING FOR RADIAL USER INTERFACE

CROSS-REFERENCE TO RELATED APPLICATIONS

This application claims priority to U.S. Provisional Application No. 63/135,573, filed Jan. 9, 2021, which is hereby incorporated by reference.

BACKGROUND INFORMATION

A smart device is an electronic device that typically communicates with other devices or networks. In some situations the smart device may be configured to operate interactively with a user. A smart device may be designed to support a variety of form factors, such as a head mounted device, a head mounted display (HMD), or a smart display, just to name a few.

Smart devices may include one or more electronic components for use in a variety of applications, such as gaming, aviation, engineering, medicine, entertainment, video/audio chat, activity tracking, and so on. Some smart devices may perform eye-tracking. A variety of techniques for eye-tracking have been developed for smart devices. Some eye-tracking techniques include capturing images of the eye and performing image processing on the images in order to determine movements and/or positions of the user's eye.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of saccade-based positioning method for a radial user interface are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
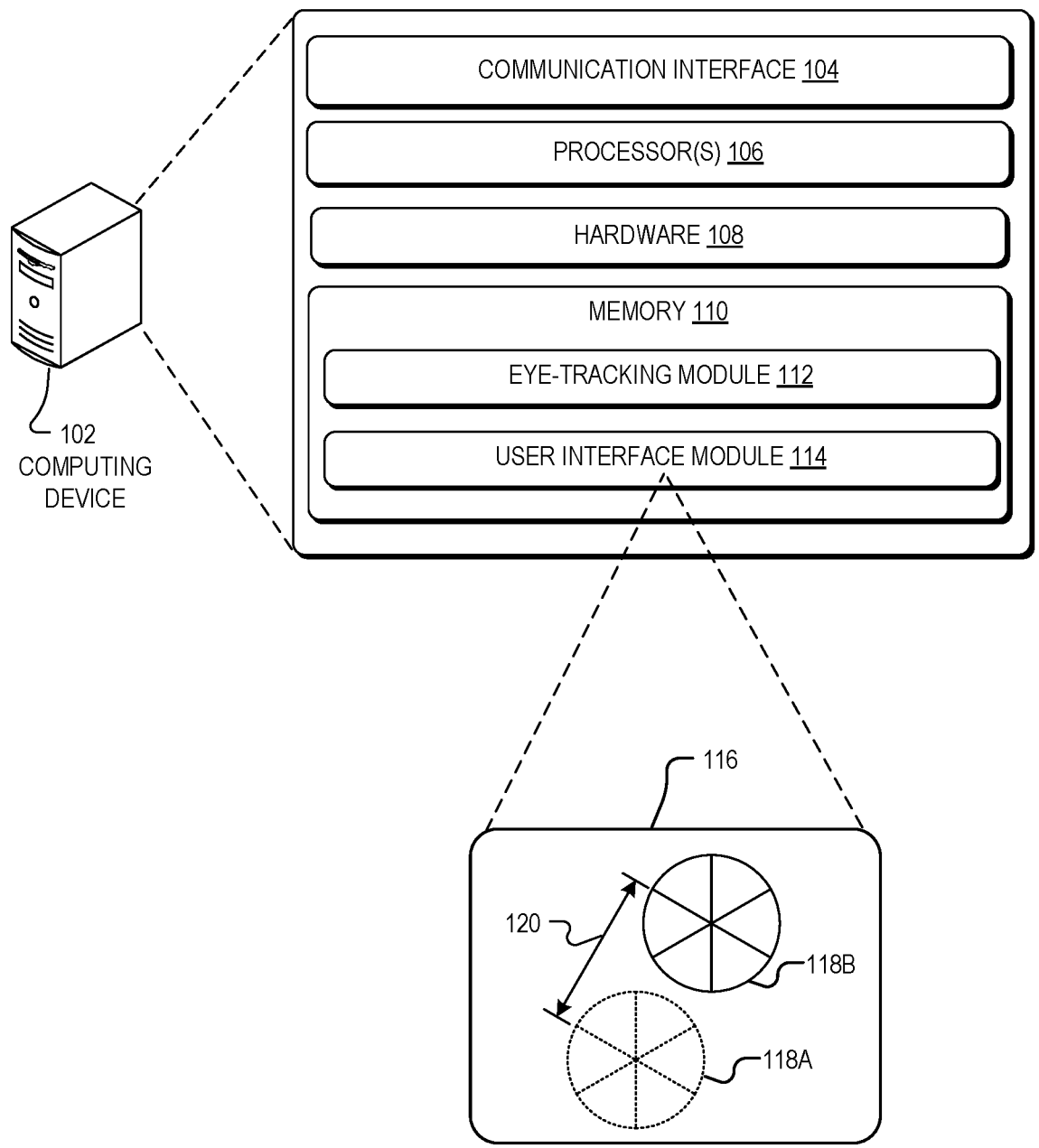
FIG. 1 illustrates a computing device, in accordance with aspects of the disclosure.

FIG. 1 illustrates a computing device 102, in accordance with aspects of the present disclosure. Computing device 102 is one example of a smart device that may be implemented as a desktop computer, laptop, a tablet computer, a smart phone, a head mounted device, a head mounted display (HMD), or a smart display, etc. The illustrated example of computing device 102 is shown as including a communication interface 104, one or more processors 106, hardware 108, and a memory 110.

The communication interface 104 may include wireless and/or wired communication components that enable the computing device 102 to transmit data to and receive data from other devices/components. The hardware 108 may include additional hardware interfaces, data communication, or data storage hardware. For example, the hardware interfaces may include a data output device, and one or more data input devices. In some aspects, hardware 108 may include an electronic display for presenting one or more computer graphics, such as a graphical user interface. In addition, hardware 108 may include one or more components of an eye-tracking system, such as a camera and/or optional optical components (e.g., lens, diffractive elements, optical combiner, etc.).

The memory 110 may be implemented using computer-readable media, such as computer storage media. In some aspects, computer-readable media may include volatile and/or non-volatile, removable and/or non-removable media implemented in any method or technology for storage of information such as computer-readable instructions, data structures, program modules, or other data. Computer-readable media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

The processors 106 and the memory 110 of the computing device 102 may implement an eye-tracking module 112 and a user interface module 114. The eye-tracking module 112 and the user interface module 114 may include routines, program instructions, objects, and/or data structures that perform particular acts, tasks or implement particular abstract data types. The memory 110 may also include a data store (not shown) that is used by the eye-tracking module 112 and user interface module 114.

The eye-tracking module 112, in conjunction with one or more components (e.g., camera) of hardware 108, may be configured to generate eye-tracking data that is representative of various aspects of a user's eye. For example, the eye-tracking data may represent the position and movement (e.g., velocity, direction of movement, etc.) of the user's eye. In some examples, the eye-tracking system of computing device 102 generates the eye-tracking data by tracking the pupil of the user's eye. While there are many useful reasons to sense the position and movement of a user's eye, in some contexts, aspects of the present disclosure may utilize eye-tracking data as user input. In some aspects, this user input may be referred to as gaze input, which may allow a user's interaction with the computing device 102 via changes in their gaze. Gaze input may be one component in Augmented and Virtual Reality (AR/VR), as it can unlock new designs and interaction paradigms. For example, one or more user interfaces may be provided that are designed to be controlled with gaze input, eliminating, or at least reducing, the need for traditional user input devices (e.g., hand-held controller).

By way of example, FIG. 1 illustrates user interface module 114 generating and presenting a first radial user interface 118A on an electronic display 116 (electronic display 116 may be included in hardware 108). As will be described in more detail below, the first radial user interface 118A may be pie-shaped and divided into several regions, where each region corresponds to a menu item that is selectable by way of a user's gaze input. In some examples, selection of a menu item is initiated through real-time analysis of the eye-tracking data to determine whether a saccade movement of the user's eye has crossed a region border of a region of the radial user interface 118A. In some aspects, a saccade movement is a swift movement of the eye (e.g., eye movement greater than one degree of visual angle over a short time period, such as 300 ms or less).

In response to detecting the selection of a menu item from the first radial user interface 118A (i.e., via the user's gaze input), the user interface module 114 may then generate and display a subsequent radial user interface 118B (i.e., also referred to as a sub-menu). Similar to the first radial user interface 118A, the subsequent radial user interface 118B also includes several regions, each corresponding to additional menu items that are selectable via gaze input. However, Applicant's studies, experimentation, and analysis suggest that successful utilization and selection of the menu items included in the subsequent radial user interface 118B are dependent, in part, on the positioning of the subsequent radial user interface 118B with respect to the first radial user interface 118A. For example, placing the subsequent radial user interface 118B at a fixed distance from the first radial user interface 118A may increase overshoot errors, accidental selection errors, false selection errors, as well as increase user fatigue. Accordingly, aspects of the present disclosure include a user interface module 114 that is configured to dynamically determine a location for the subsequent radial user interface 118B. In some aspects, the 'location' of the subsequent radial user interface 118B refers to the distance 120 between the first radial user interface 118A and the subsequent radial user interface 118B. As will be described in more detail below, determining the location of the subsequent radial user interface 118B may be based, in part, on the velocity of the detected saccade movement. For example, for saccade movements that are less than a first velocity threshold, a center of the subsequent radial user interface 118B may be set on an exterior border of the first radial user interface 118A (e.g., see FIG. 3C). In other instances, the center of the subsequent radial user interface 118B may be set to a location of a determined saccade landing position of the saccade movement (e.g., see FIG. 3E).

Figure 2:
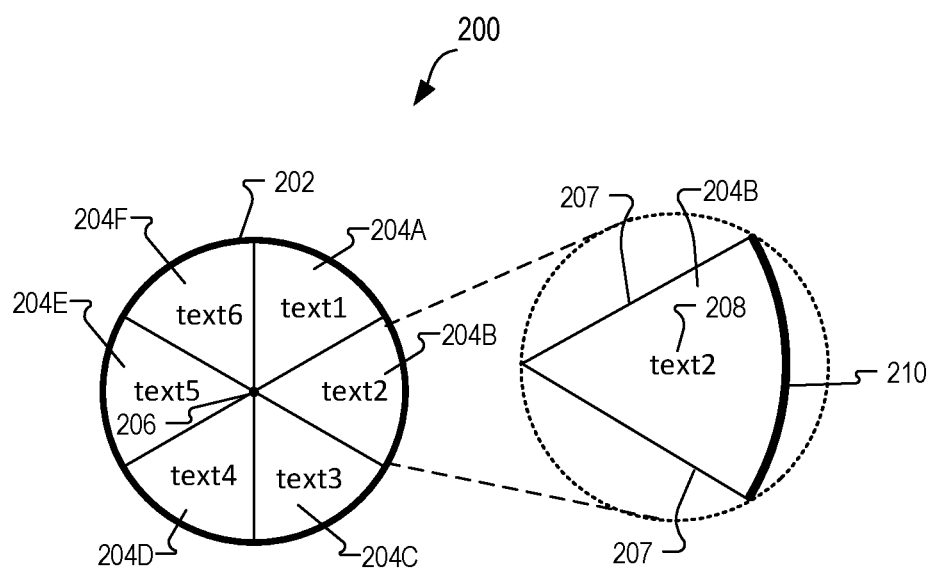
FIG. 2 illustrates a radial user interface, in accordance with aspects of the disclosure.

FIG. 2 illustrates an example radial user interface 200, in accordance with aspects of the disclosure. Radial user interface 200 is one possible implementation of the first radial user interface 118A or the subsequent radial user interface 118B of FIG. 1. As shown, radial user interface 200 includes an exterior border 202 that encompasses a plurality of regions 204A-204F. Although FIG. 2 illustrates radial user interface 200 as including six (6) regions, any number of regions may be included in the radial user interface 200 including 2 or more, but preferably, less than eight (8). In one aspect, each of the regions 204A-204F are adjoining. In addition, each region 204A-204F may include at least one graphical element. Although FIG. 2 illustrates the graphical elements as text (e.g., TEXT1-TEXT6), in other examples, the graphical elements may include an icon, shading, coloring, a picture, animation, or any combination thereof.

Furthermore, FIG. 2 illustrates exterior border 202 shaped as a circle having a center 206, where each region 204A-204F is a sector of the circle. By way of example, FIG. 2 also illustrates an expanded view of the region 204B, shaped as a sector of the circular-shaped exterior border 202. As shown, region 204B includes a curved region border 210 and two edges 207. In some aspects, each edge 207 has a length equal to a radius of the circular-shaped exterior border 202, where region border 210 is coincident with the exterior border 202. Furthermore, although FIG. 2 illustrates exterior border 202 as circular-shaped, other shapes of exterior border 202 may be implemented consistent with the teaching herein. For example, exterior border 202 may be shaped as a hexagon.

FIGS. 3A, 3B, 3C, 3D, and 3E illustrate example processes for displaying a first radial user interface and a subsequent radial user interface, in accordance with aspects of the disclosure. The processes described below with reference to FIGS. 3A-3E are possible processes performed by the computing device 102 of FIG. 1.

Figure 3A:
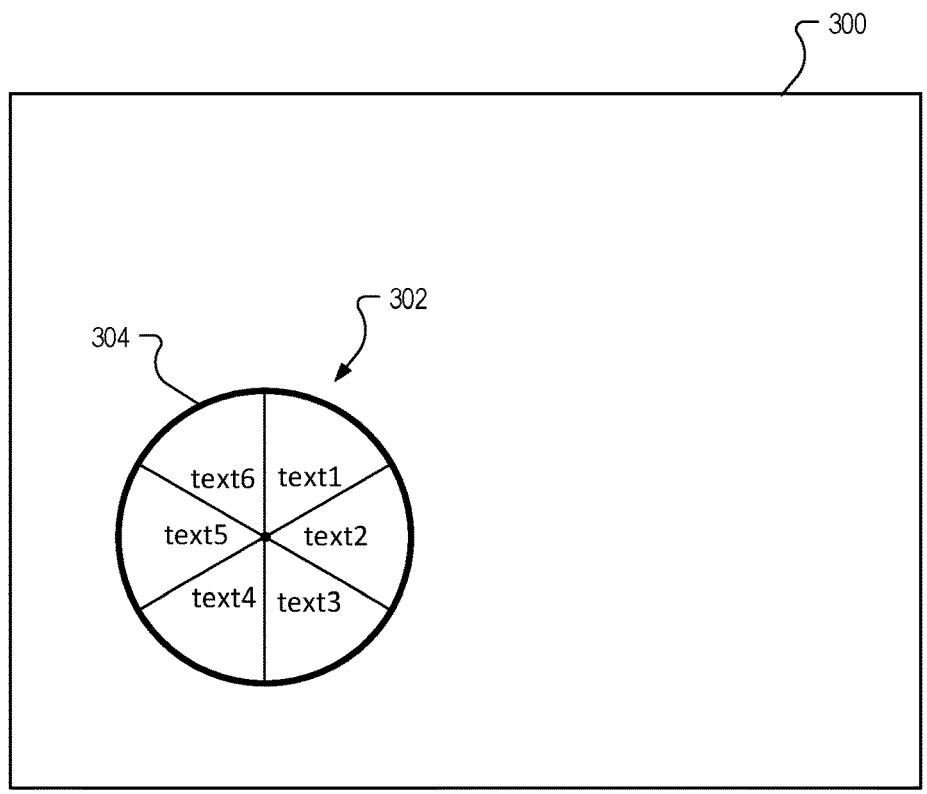
FIGS. 3A, 3B, 3C, 3D, and 3E illustrate example processes for displaying a first radial user interface and a subsequent radial user interface, in accordance with aspects of the disclosure.

FIG. 3A illustrates the display of a first radial user interface 302 on an electronic display 300. The first radial user interface 302 is shown as including an exterior border 304. In some examples, the displaying of the first radial user interface 302 is initiated in response to user input, such as the press of a button on a user input device (e.g., hand-held controller, keyboard, mouse, or other button), a voice-activated command, or other user input. In another example, the display of the first radial user interface 302 is initiated autonomously by software executed by computing device 102 in order to gain further user input.

Figure 3B:
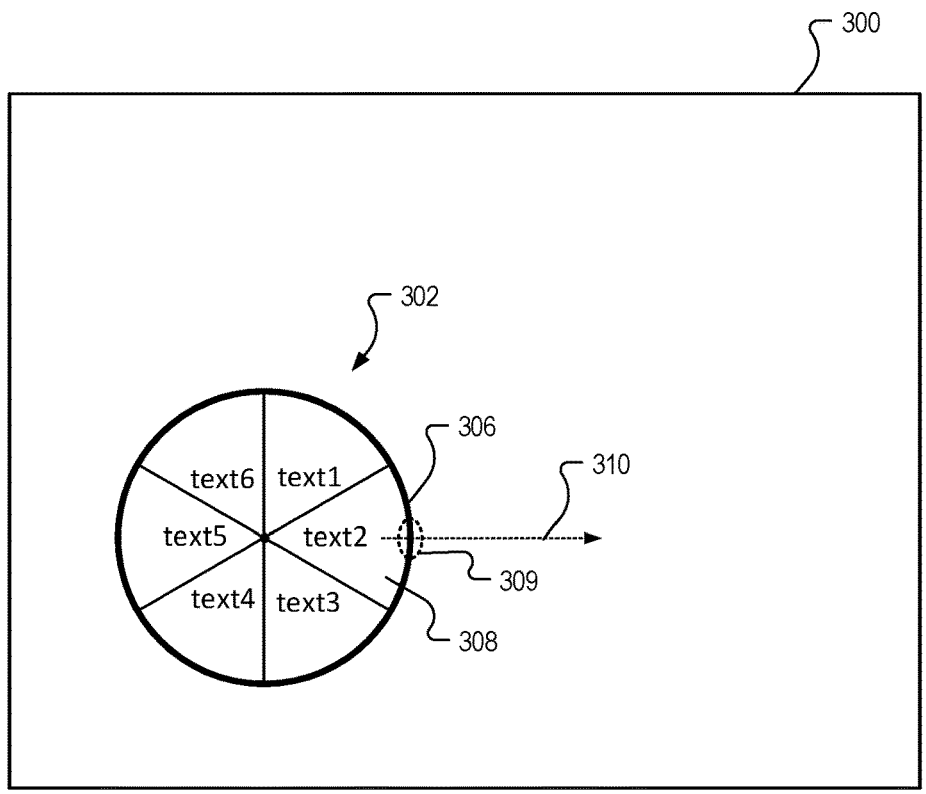

FIG. 3B illustrates the detection of a saccade movement 310 of a user's eye. In some examples, the user interface module 114 is configured to detect the saccade movement 310 based on eye-tracking data received from the eye-tracking module 112. In one aspect, the user interface module 114 is configured to determine whether an eye movement is a saccade movement based on analysis of the velocities of detected eye movements. In particular, determining whether a detected movement of the eye is a saccade movement versus some other classification of eye movement (e.g., smooth pursuit, vestibulo-ocular reflex, etc.) is based on an analysis of a velocity profile (i.e., velocity of eye movements over a time period) of the detected movement.

Once the saccade movement 310 is detected, the user interface module 114 may determine whether the saccade movement 310 crosses a region border of any of the regions of the first radial user interface 302. As shown in the example of FIG. 3B, saccade movement 310 does indeed perform a border crossing 309 of the region border 306 of region 308. In some aspects of the present disclosure, no fixation by the eye on a particular region is required to precede the detection of the border crossing 309. That is, some conventional systems may require a user to fixate within a particular region before recognizing a menu selection, often referred to a dwell time. However, longer dwell times increase overhead, slowing the overall menu selection especially when multiple sub menus are to be presented. In addition, shorter dwell times may increase instances of an unintentional selection error. Accordingly, aspects of the present disclosure may eliminate such dwell time by not requiring any fixation by the user's eye on any particular region. Instead, as discussed above, aspects of the present disclosure may include selection by detecting a region border crossing (e.g., border crossing 309). Thus, in the particular example of FIG. 3B, saccade movement 310 does not need to originate within region 308 in order for the saccade movement 310 to be recognized as a selection of the menu item associated with region 308. That is, saccade movement 310 may originate at the center of the first radial user interface 302, or within another of the other regions. Utilizing border crossing 309 without a prior fixation requirement may increase the speed with which a user is able to complete a menu selection, decrease fatigue experienced by the user as compared to conventional systems, and decrease the instances of an unintended menu selection. It is noted that the dashed line corresponding to saccade movement 310 and the dashed oval corresponding to border crossing 309 may not be displayed to the user on display 300 but are illustrated in FIG. 3B for ease of explanation.

Figure 3C:
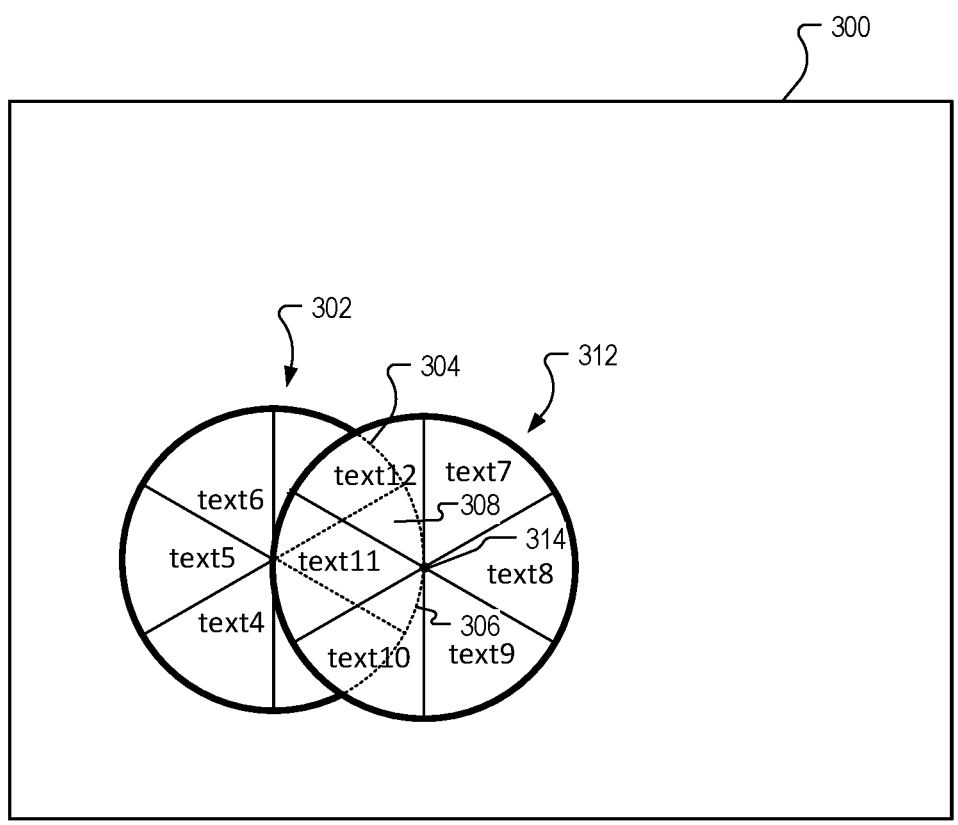

In response to detecting the border crossing 309 of the saccade movement 310, the user interface module 114 may begin preparing to display a subsequent radial user interface that corresponds to the selected region 308. As discussed above, the user interface module 114 is configured to dynamically determine a location for the subsequent radial user interface. In some aspects, determining the location of the subsequent radial user interface may be based, in part, on the velocity of the saccade movement 310. For example, if the velocity of saccade movement 310, at the border crossing 309, is less than a first velocity threshold (e.g., 30 degree per second), then user interface module 114 may set a center of the subsequent radial user interface on the exterior border 304, and in particular, on the region border 306 of the region 308. By way of illustration, FIG. 3C shows a center 314 of a subsequent radial user interface 312 that is placed on the region border 306 and on the exterior border 304. The user may then select one of the items presented on the subsequent radial user interface 312 using the same process of saccade-based border crossing detection. In some aspects, one or more additional radial user interfaces may be presented based on the gaze input provided by the user with respect to the subsequent radial user interface 312.

Figure 3D:
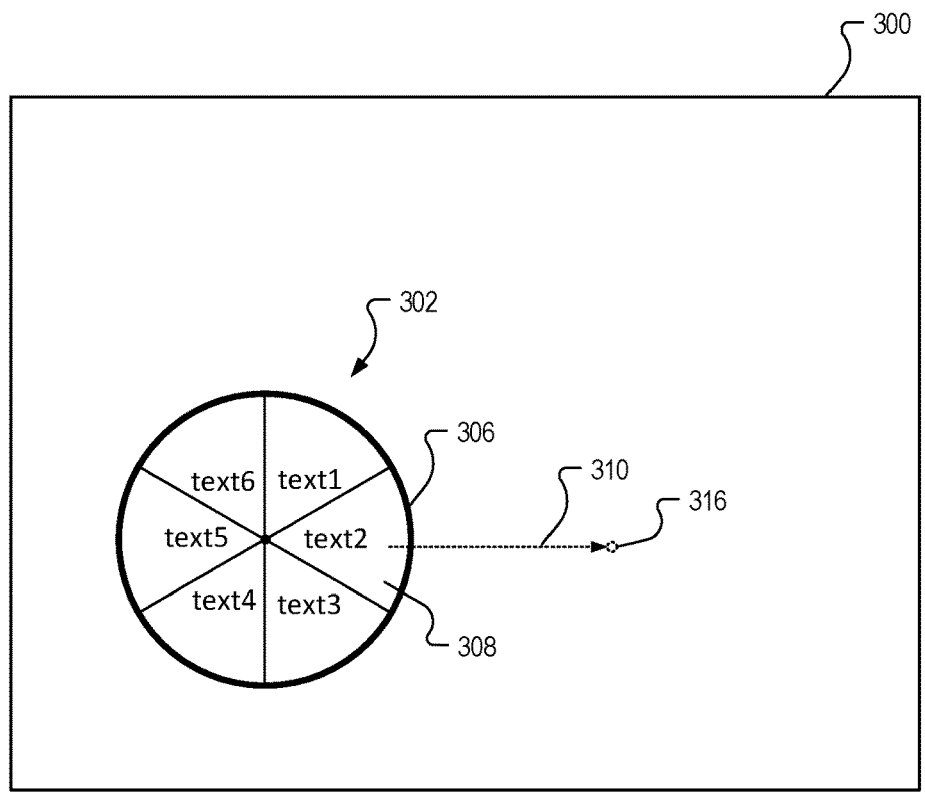

Referring back to FIG. 3B, if the velocity of the saccade movement 310 at the border crossing 309 is determined to be greater than the first velocity threshold, then the user interface module 114 is configured to set the center of the subsequent radial user interface to a location of a saccade landing position of the saccade movement. For example, FIG. 3D illustrates a saccade landing position 316 of the saccade movement 310 that is determined by the user interface module 114. In some aspects, the saccade landing position 316 is a current eye gaze position at a time when the velocity drops below a second (lower) velocity threshold.

Figure 3E:
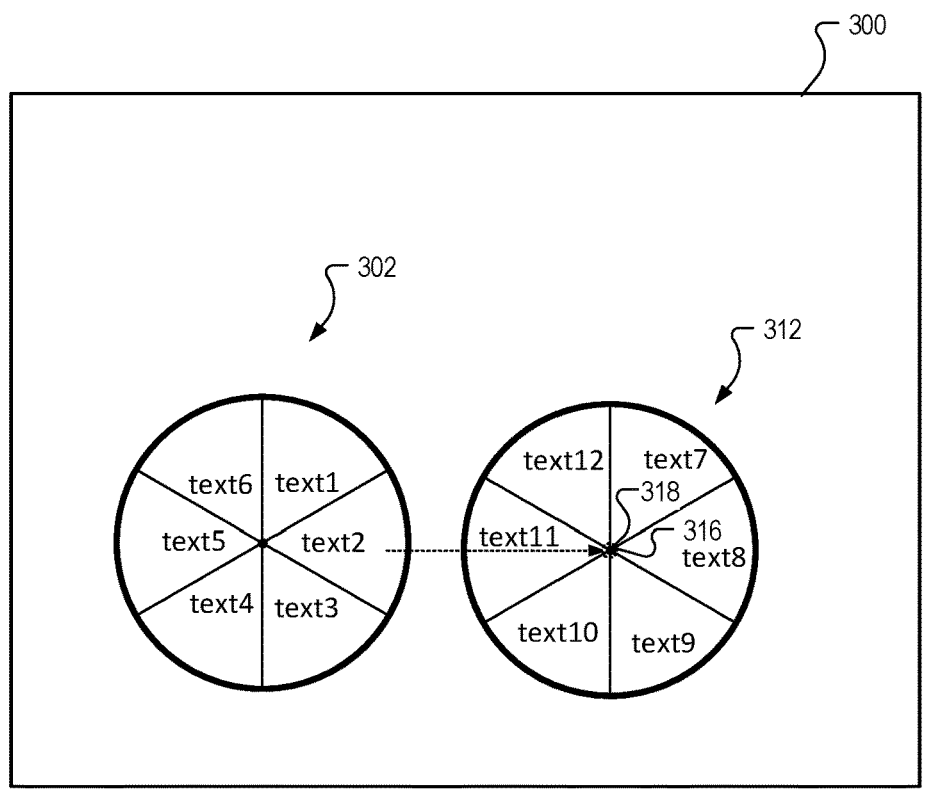

After the saccade landing position 316 is determined, the user interface module 114 then places the subsequent radial user interface at the saccade landing position 316. For example, FIG. 3E illustrates a center 318 of the subsequent radial user interface 312 set at the same location as the saccade landing position 316. Similar to that described above with reference to FIG. 3C, the user may then select one of the items presented on the subsequent radial user interface 312 using the same process of saccade-based border crossing detection, wherein one or more additional radial user interfaces may be presented based on the gaze input provided by the user.

Figure 4A:
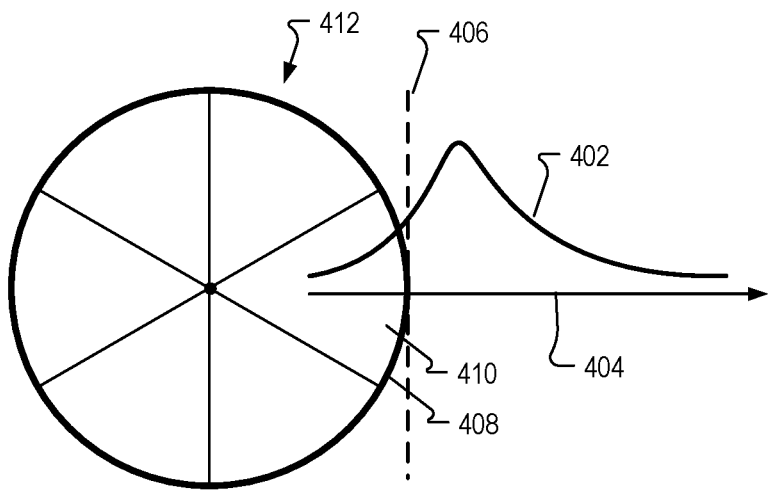
FIGS. 4A and 4B illustrate a velocity profile of a saccade movement, in accordance with aspects of the disclosure.
Figure 4B:
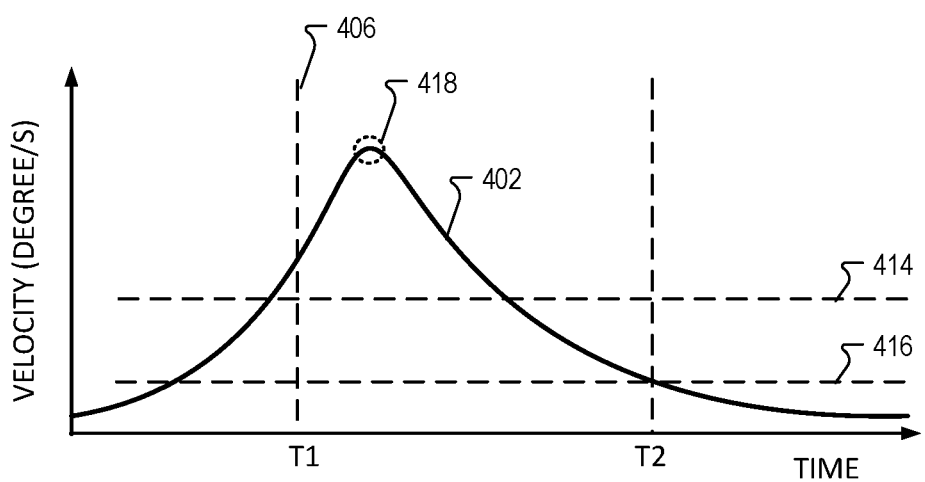

FIG. 4A illustrates a velocity profile 402 of a saccade movement 404, in accordance with aspects of the disclosure. The velocity profile 402 illustrates the velocity of the eye at different points along the path of the saccade movement 404. FIG. 4A also illustrates a border crossing 406. As shown, border crossing 406 is a crossing of region border 408 of region 410 of the radial user interface 412. FIG. 4B illustrates further details of the velocity profile 402, but with respect to time. FIG. 4B also illustrates a first velocity threshold 414, a second velocity threshold 416, and a peak velocity 418. FIG. 4B illustrates the border crossing 406 occurring at time T1. As shown, the velocity of the saccade movement 404 at time T1 is greater than the first velocity threshold. Thus, as described above with reference to FIGS. 3D and 3E, the user interface module 114 may determine a saccade landing position at which to set location of a subsequent radial user interface. FIG. 4B illustrates the velocity of the saccade movement 404 dropping to the second velocity threshold 416 at time T2. Thus, the user interface module 114 may determine the saccade landing position to a current eye gaze position at time T2. In one example, the first velocity threshold 414 is greater than the second velocity threshold 416. In particular, the first velocity threshold 414 may be approximately 30 degrees per second and the second velocity threshold may be approximately 10 degrees per second.

Figure 5:
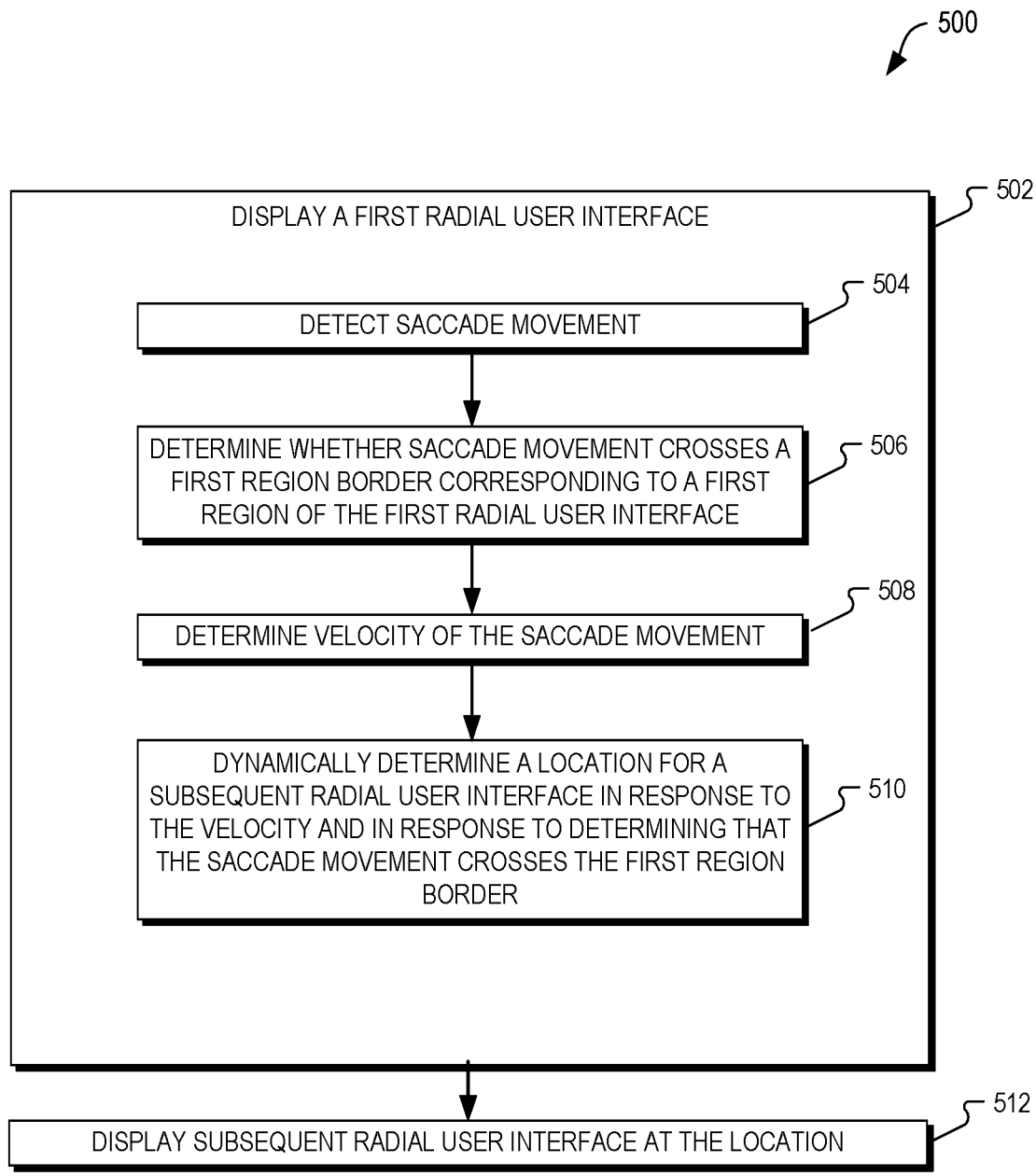
FIG. 5 is a flow chart illustrating a process of saccade-based positioning of for a radial user interface, in accordance with aspects of the disclosure.

FIG. 5 is a flow chart illustrating a process 500 of saccade-based positioning of for a radial user interface, in accordance with aspects of the disclosure. Process 500 is one possible process performed by the computing device 102 of FIG. 1. In a process block 502, the user interface module 114 displays a first radial user interface on a display (e.g., first radial user interface 118A displayed on display 116). While the first radial user interface 118A is being displayed the user interface module 114 may perform several operations, including process blocks 504-510, as shown in FIG. 5. In particular, process block 504 includes the user interface module 114 detecting a saccade movement (e.g., saccade movement 404 of FIG. 4A) based on eye-tracking data received from the eye-tracking module 112. Next, in a process block 506, the user interface module 114 determines whether the saccade movement crosses a first region border corresponding to a first region of the first radial user interface (e.g., FIG. 4A illustrates a border crossing 406 of region border 408 of region 410). Process block 508 includes the user interface module 114 determining the velocity of the saccade movement. In some examples, the velocity is provided or determined based on the eye-tracking data received from the eye-tracking module 112. Next, in process block 510, the user interface module 114 may dynamically determine a location for a subsequent radial user interface in response to the velocity and in response to determining that the saccade movement has indeed crossed the region border. The location of the subsequent radial user interface may be placed on the exterior border of the first radial user interface, such as shown in FIG. 3C or it may be placed at a determined saccade landing position, such as shown in FIG. 3E. Once the location of the subsequent radial user interface is determined process block 512 then includes displaying the subsequent radial user interface on the display at the determined location (e.g., FIG. 4A illustrates the display of subsequent radial user interface 118B on display 116).

Figure 6:
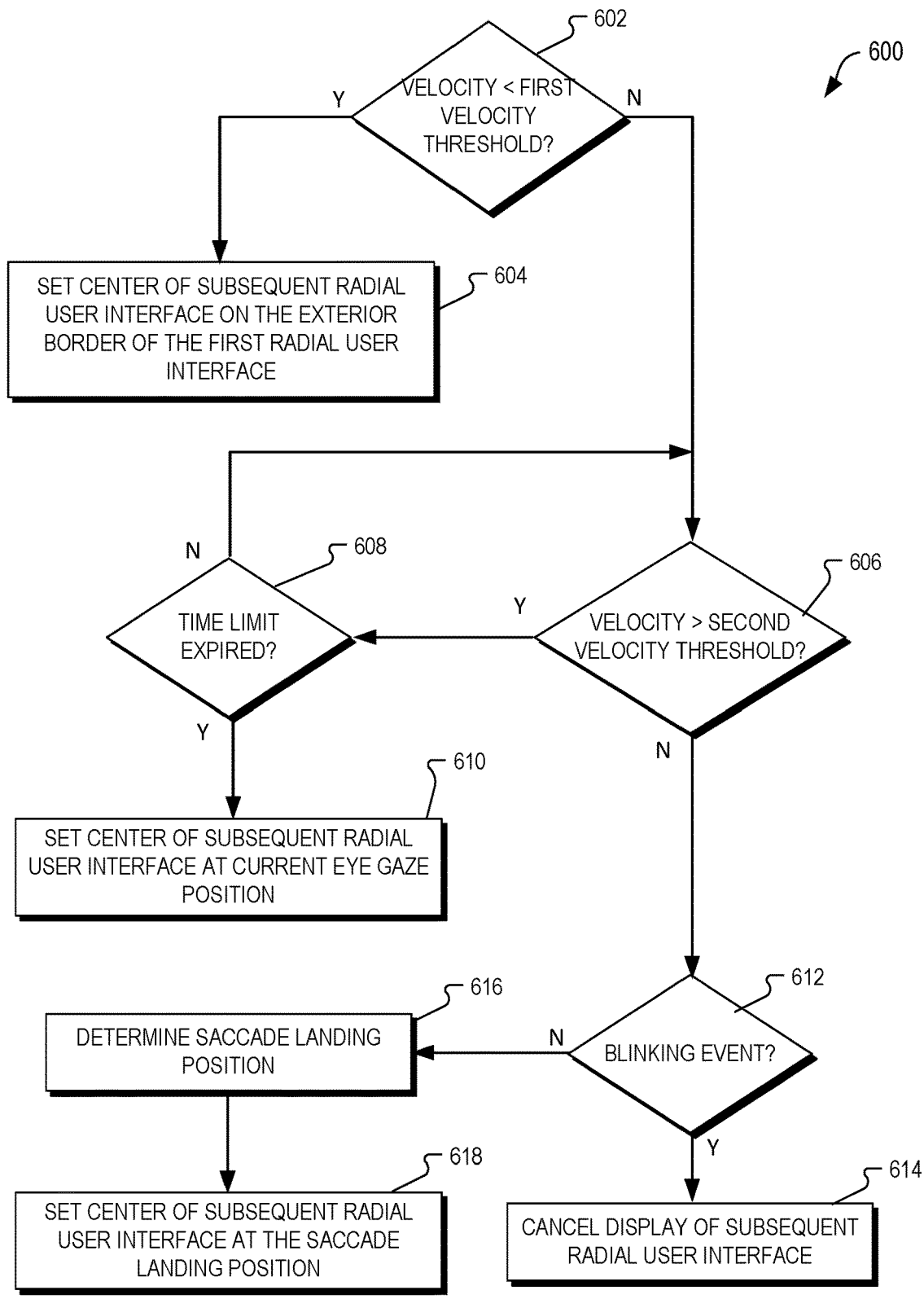
FIG. 6 is a flow chart illustrating a process of dynamically determining a location for a subsequent radial user interface, in accordance with aspects of the disclosure.

FIG. 6 is a flow chart illustrating a process 600 showing possible implementation details of the process block 510 of FIG. 5. That is, process 600 is one possible implementation of dynamically determining a location for a subsequent radial user interface, in accordance with aspects of the disclosure. Process 600 will be described with reference to FIG. 4B.

In a decision block 602, the user interface module 114 determines whether the velocity of the saccade movement 404 is less than the first velocity threshold 414 at time T1 (i.e., corresponding to the border crossing 406). If so, process 600 proceeds to process block 604 where the center of the subsequent radial user interface is set on the exterior border of the first radial user interface (e.g., see FIG. 3C). If however, the velocity of the saccade movement 404 is determined to be not less than the first velocity threshold 414, then process 600 proceeds to decision block 606. In decision block 606, the user interface module 114 determines whether the velocity is greater than the second velocity threshold 416. If so, then process 600 proceeds to decision block 608.

In some implementations, a time limit may be utilized by the user interface module 114 to limit detection overhead. That is, if the velocity does not drop below the second velocity threshold (e.g., second velocity threshold 416 of FIG. 4B) within the time limit then there may be a delay is presenting the subsequent radial user interface, which may cause errors or discomfort by the user. Thus, in some examples, a time limit begins at time T1 (i.e., at the same time as the border crossing 406). The time limit may be approximately 200 ms. If, in decision block 608, the velocity has not dropped below the second velocity threshold before expiration of the time limit, then process 600 proceeds to process block 610, where a center of the subsequent radial user interface is set at the current eye gaze position. That is, the location of the subsequent radial user interface may be set to the current eye gaze position as determined by the eye-tracking data at the time when the time limit expired.

If, however, the time limit has not expired before the velocity drops below the second velocity threshold, in decision block 606, then process 600 proceeds to decision block 612.

In some examples, process 600 includes an optional feature of detecting a blinking event. If a user blinks during the saccade movement, then one or more results of the present process may be inaccurate, such as the determination of velocity and/or the determination of the saccade landing position. Thus, if a blinking event is detected in decision block 612, then process 600 proceeds to process block 614 where the menu selection is canceled and the display of the subsequent radial user interface is cancelled.

In one aspect, a blinking event may be determined based on the peak velocity 418 of the saccade movement. For example, if the peak velocity exceeds a peak velocity threshold, then it is determined that the saccade movement 404 includes a blinking event. In some examples, the peak velocity threshold is approximately 800 degrees per second. In another example, a blinking event may be detected in response to determining that an amplitude of the saccade movement exceeds an amplitude threshold. The amplitude of the saccade movement 404 may refer to a total amount of eye movement. For example, the amplitude may refer to a distance from a starting position of the saccade movement to the saccade landing position (e.g., saccade landing position 316 of FIG. 3D). In one implementation, the amplitude threshold is approximately 45 degrees.

In some aspects, when a user blinks their eyes, two saccade movements appear: a first saccade movement that is a downward-directed saccade that occurs with the closing of the eye; and a second saccade movement that is an upward-directed saccade that occurs with the opening of the eye. Both the first and second saccade movements may have a greater amplitude and greater peak velocity as compared to usual saccade movements (i.e., saccade movements not due to blinking). Thus, in some examples of the present disclosure, a blinking event is determined by detecting both the first downward-directed saccade followed by the second upward-directed saccade.

If no blinking event is detected in decision block 612, then process 600 proceeds to process block 616, where the saccade landing position is determined (e.g., see saccade landing position 316 of FIG. 3D). As discussed above, the user interface module 114 may determine the saccade landing position is the current eye gaze position (i.e., the eye gaze position when the velocity dropped below the second velocity threshold, such as, time T2 in FIG. 4B). In process block 618, the user interface module 114 proceeds to set the center of the subsequent radial user interface at the saccade landing position (e.g., see FIG. 3E).

In some implementations, aspects of the present disclosure may be utilized in a head mounted device, such as a virtual reality (VR) or augmented reality (AR) device. In some aspects, a head mounted device may incorporate a computing device, such as computing device 102 of FIG. 1 that includes an eye-tracking module 112 and a user interface module 114 for presenting one or more radial user interfaces to a user.

Figure 7:
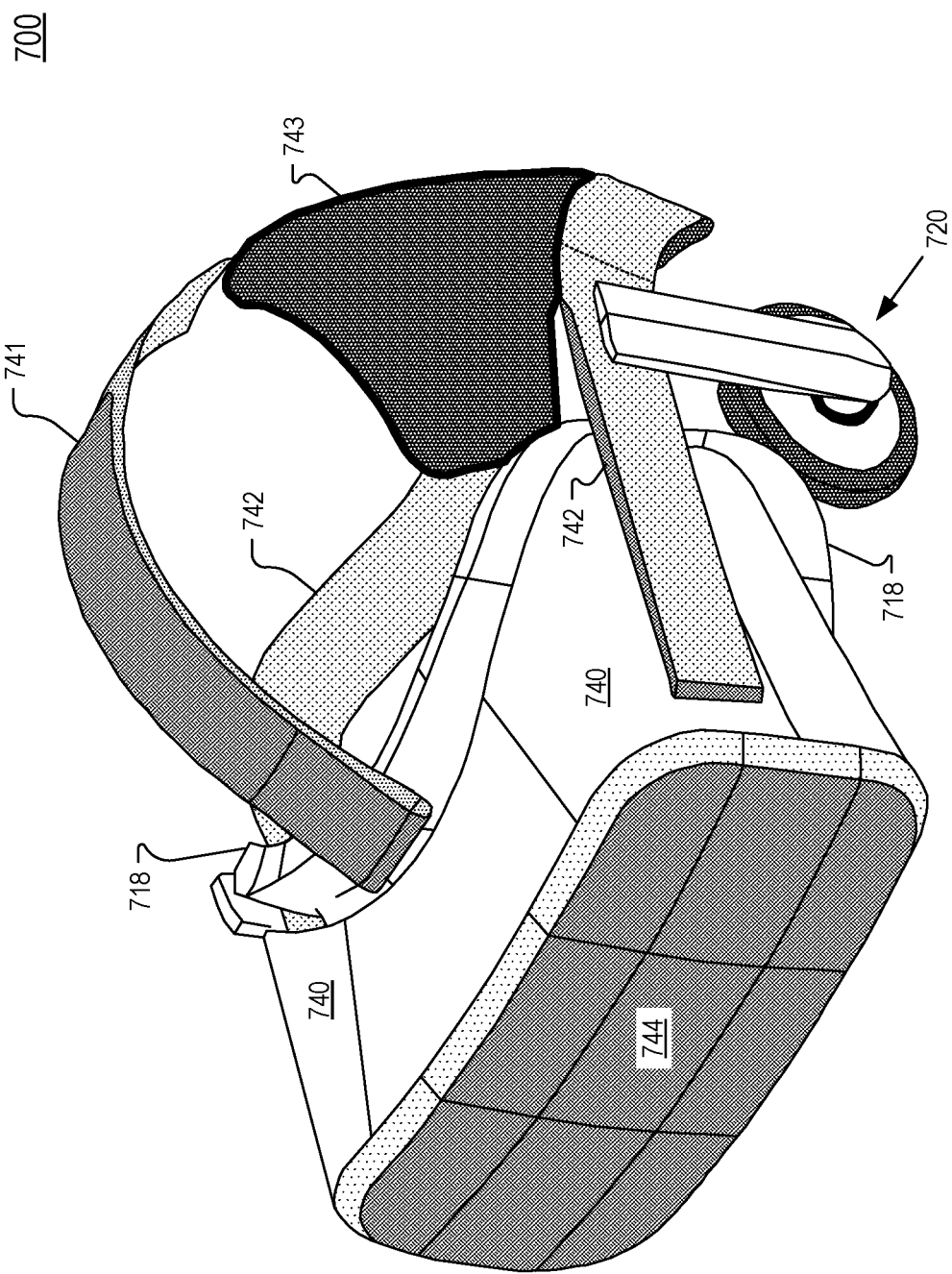
FIG. 7 illustrates a head-mounted display (HMD), in accordance with aspects of the disclosure.

By way of example, FIG. 7 illustrates a head-mounted display (HMD) 700, in accordance with aspects of the present disclosure. An HMD, such as HMD 700, is one type of smart device, typically worn on the head of a user to provide artificial reality content to a user. Artificial reality is a form of reality that has been adjusted in some manner before presentation to the user, which may include, e.g., virtual reality (VR), augmented reality (AR), mixed reality (MR), hybrid reality, or some combination and/or derivative thereof. The illustrated example of HMD 700 is shown as including a viewing structure 740, a top securing structure 741, a side securing structure 742, a rear securing structure 743, and a front rigid body 744. In some examples, the HMD 700 is configured to be worn on a head of a user of the HMD 700, where the top securing structure 741, side securing structure 742, and/or rear securing structure 743 may include a fabric strap including elastic as well as one or more rigid structures (e.g., plastic) for securing the HMD 700 to the head of the user. HMD 700 may also optionally include one or more earpieces 720 for delivering audio to the ear(s) of the user of the HMD 700.

The illustrated example of HMD 700 also includes an interface membrane 718 for contacting a face of the user of the HMD 700, where the interface membrane 718 functions to block out at least some ambient light from reaching to the eyes of the user of the HMD 700.

Example HMD 700 may also include a chassis for supporting hardware of the viewing structure 740 of HMD 700 (chassis and hardware not explicitly illustrated in FIG. 7). The hardware of viewing structure 740 may include any of processing logic, wired and/or wireless data interface for sending and receiving data, graphic processors, and one or more memories for storing data and computer-executable instructions, such as described above with reference to computing device 102 of FIG. 1. In one example, viewing structure 740 may be configured to receive wired power and/or may be configured to be powered by one or more batteries. In addition, viewing structure 740 may be configured to receive wired and/or wireless data including video data.

Viewing structure 740 may include a display system having one or more electronic displays for directing light to the eye(s) of a user of HMD 700. The display system may include one or more of a liquid crystal display (LCD), an organic light emitting diode (OLED) display, a micro-LED display, etc. for emitting light (e.g., content, images, video, etc.) to a user of HMD 700. The viewing structure 740 may also include an optical assembly that is configured to receive the image light from the display system and generate a virtual image (e.g., by collimating the image light) for viewing by an eye of a wearer of the HMD 700.

The processes explained above may be described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method, comprising:
    at an electronic device having a display and an eye-tracking system:
        displaying, on the display, a first radial user interface;
        while displaying the first radial user interface:
            detecting a saccade movement based on eye-tracking data received from the eye-tracking system;
            determining whether the saccade movement crosses a first region border corresponding to a first region of the first radial user interface;
            determining a velocity of the saccade movement based on the eye-tracking data; and
            dynamically determining a location for a subsequent radial user interface in response to the velocity and in response to determining that the saccade movement crosses the first region border; and
        displaying, on the display, the subsequent radial user interface at the location.

2. The method of claim 1, wherein the first radial user interface comprises an exterior border that encompasses a plurality of regions that includes the first region, each region of the plurality of regions having at least one graphical element and a region border that is coincident with at least a portion of the exterior border.

3. The method of claim 2, wherein the exterior border is circle and at least one region of the plurality of regions is sector of the circle.

4. The method of claim 2, further comprising:
    determining a saccade landing position of the saccade movement, wherein displaying the subsequent radial user interface comprises setting a center of the subsequent radial user interface at the saccade landing position.

5. The method of claim 2, wherein displaying the subsequent radial user interface comprises setting a center of the subsequent radial user interface on the exterior border of the first radial user interface in response to determining that the velocity is less than a first velocity threshold.

6. The method of claim 5, further comprising:
    determining that the velocity is less than a second velocity threshold, and in response thereto:
        determining a saccade landing position of the saccade movement; and
        setting the center of the subsequent radial user interface at the saccade landing position.

7. The method of claim 6, wherein the first velocity threshold is greater than the second velocity threshold.

8. The method of claim 7, wherein the first velocity threshold is approximately 30 degrees per second and the second velocity threshold is approximately 10 degrees per second.

9. The method of claim 6, further comprising:
    setting a time limit; and
    setting the center of the subsequent radial user interface to a current eye gaze position in response to the velocity failing to decrease to less than the second velocity threshold before expiration of the time limit.

10. The method of claim 6, further comprising:
    in response to determining that the velocity is less than the second velocity threshold, determining whether the saccade movement includes a blinking event; and
    canceling the displaying of the subsequent radial user interface in response to determining that the saccade movement includes the blinking event.

11. The method of claim 10, wherein determining whether the saccade movement includes the blinking event comprises:
    determining whether a peak velocity of the saccade movement exceeds a peak velocity threshold.

12. The method of claim 11, wherein the peak velocity threshold is approximately 800 degrees per second.

13. The method of claim 10, wherein determining whether the saccade movement includes the blinking event comprises:
    determining whether an amplitude of the saccade movement exceeds an amplitude threshold.

14. The method of claim 13, wherein the amplitude threshold is approximately 45 degrees.

15. One or more non-transitory computer-readable media storing computer-executable instructions that upon execution cause one or more processors to perform acts comprising:
    displaying, on a display, a first radial user interface;
    while displaying the first radial user interface:

detecting a saccade movement based on eye-tracking data received from an eye-tracking system;

determining whether the saccade movement crosses a first region border corresponding to a first region of the first radial user interface;

determining a velocity of the saccade movement based on the eye-tracking data; and dynamically determining a location for a subsequent radial user interface in response to the velocity and in response to determining that the saccade movement crosses the first region border; and displaying, on the display, the subsequent radial user interface at the location.

16. The one or more non-transitory computer-readable media of claim 15, wherein the acts further comprise:

determining a saccade landing position of the saccade movement, wherein displaying the subsequent radial user interface comprises setting a center of the subsequent radial user interface at the saccade landing position.

17. The one or more non-transitory computer-readable media of claim 15, wherein displaying the subsequent radial user interface comprises setting a center of the subsequent radial user interface on an exterior border of the first radial user interface in response to determining that the velocity is less than a first velocity threshold.

18. A head-mounted device, comprising:

an electronic display;

an eye-tracking system;

one or more processors coupled to the electronic display and the eye-tracking system; and memory that includes a plurality of computer-executable instructions that are executable by the one or more processors to perform a plurality of actions comprising:

displaying, on the electronic display, a first radial user interface;

while displaying the first radial user interface:

detecting a saccade movement based on eye-tracking data received from the eye-tracking system;

determining whether the saccade movement crosses a first region border corresponding to a first region of the first radial user interface;

determining a velocity of the saccade movement based on the eye-tracking data; and dynamically determining a location for a subsequent radial user interface in response to the velocity and in response to determining that the saccade movement crosses the first region border; and displaying, on the electronic display, the subsequent radial user interface at the location.

19. The head-mounted device of claim 18, wherein the plurality of actions further comprise:

determining a saccade landing position of the saccade movement, wherein displaying the subsequent radial user interface comprises setting a center of the subsequent radial user interface at the saccade landing position.

20. The head-mounted device of claim 18, wherein displaying the subsequent radial user interface comprises setting a center of the subsequent radial user interface on an exterior border of the first radial user interface in response to determining that the velocity is less than a first velocity threshold.

* * * * *